United States Patent [19]

Kawabata et al.

[11] 4,415,924
[45] Nov. 15, 1983

[54] PHOTOELECTRIC TRANSDUCER DEVICE

[75] Inventors: Takashi Kawabata, Kamakura; Takao Kinoshita, Tokyo; Nobuhiko Shinoda, Tokyo; Shinji Sakai, Tokyo; Kazuya Hosoe, Machida, all of Japan

[73] Assignee: Canon Kabushiki Kaisha, Tokyo, Japan

[21] Appl. No.: 245,349

[22] Filed: Mar. 19, 1981

[30] Foreign Application Priority Data

Mar. 22, 1980 [JP] Japan ................................ 55-36765

[51] Int. Cl.³ .............................................. H04N 9/04
[52] U.S. Cl. ....................................... 358/50; 358/41; 358/213
[58] Field of Search ..................................... 358/41–43, 358/44, 49, 50, 209, 212, 213, 227

[56] References Cited

U.S. PATENT DOCUMENTS 3,967,056 6/1976 Yata ..................................... 358/227
4,200,892 4/1980 Weimer ............................... 358/213
4,218,623 8/1980 Utagawa ............................. 358/105

FOREIGN PATENT DOCUMENTS 1562173 5/1978 Fed. Rep. of Germany ...... 358/212

Primary Examiner—Michael A. Masinick
Attorney, Agent, or Firm—Toren, McGeady and Stanger

[57] ABSTRACT

In a photoelectric transducer device such as a solid state image pick-up device or sensor having a great number of minute photoelectric transducer elements with their image-receiving surfaces of certain shape arranged in a one-dimensional or two-dimensional manner so that brightness informations of the various individual sections of the object image are sensed by the respective photoelectric transducer elements which then produce outputs in the form of time-sequential signals, the above-described shape of the image-receiving surface area of each of the minute photoelectric transducer elements is made to be such that, as the distance from the center of the image receiving area toward the margin increases, the proportion of the area of a progressively farther concentric zone of the same width is decreased. The shape takes such a form or such characteristics as to be represented by a sampling function or other analogous functions with respect to the scanning direction of the image pick-up device.

4 Claims, 15 Drawing Figures

—16

—17

—18

—19

—20

PHOTOELECTRIC TRANSDUCER DEVICE

BACKGROUND OF THE INVENTION

This invention relates to photoelectric transducer devices usable as image pick-up elements for television cameras, or as sensor elements for auto-focus systems in photographic cameras.

Recently, photoelectric transducer devices using minute photoelectric transducer elements have found their increasing use as an image pick-up element in television cameras, or as a device for AF in photographic cameras. In particular, a great number of silicon photodiodes (SPD) in an array constituting an XY assigning device, and a charge coupled device (CCD) are used as a light sensor for converting the brightnesses of the various image sections in the image plane to electrical signals in time sequence which are read out in the form of a video signal.

What has also generally been used in the past as the light sensor is the electron beam scanning type image pick-up device, for example, in the form of a vidicon type image pick-up tube having a target surface of finely-divided photoelectric particles on which an image of the object is focused while being scanned by a fine electron beam to obtain a video signal. This scanning electron beam is of almost round cross-section at the target plane. The brightness informations of the various image sections are read out by an electron beam in time sequence so as to provide outputs in the form of a video signal.

On the other hand, in order to construct a two-dimensional light sensor by the use of a solid state image pick-up device such as a CCD, it is the common practice in the prior art to configure each element in the photoelectric transducer to a square shape. These square elements all integrate the object brightnesses within the respective image-receiving surfaces and store them in the form of charges which are then sequentially read out on the basis of the self-transfer function in response to clock pulses. Thus, types of information representing the brightnesses of the various image sections corresponding to the addresses of the respective elements can be obtained as the time-sequential signals.

In this connection, it should be pointed out that, when the individual minute photoelectrical transducer elements are arranged to define the individual respective image sections, each of the minute elements converts the sum of brightness within its image receiving surface of a corresponding electrical quantity, and therefore when each minute element is square in the area as has been mentioned above, it cannot be said in a strict sense that the output of each element is, in sampling the brightness of the respective image section.

That is, in general, the "brightness information in each minute image section" essentially refers to "what is obtained by integrating the brightness while reducing the weight for the brightness value progressively from the center of the area of that image section outwards." In the case of the square photoelectric transducer elements, such weighting is neglected and instead a uniformization is crept in.

There are exceptions, however, if the objective lens for forming an image of the object on the array of these photoelectric elements has so large an aberration that the brightnesses at the various points on the object are to be distributed about the corresponding image points at the focal plane and are somewhat weighted. In this case, the error resulting from the above-described particular shape of each of the minute image sensing elements can be compensated for to some extent.

However, where the outputs from the elements, for example, between adjacent two bits to each other are compared, the use of the square element configuration can create a large gap between the output signals, because the weight in the neighborhood of the boundary between the two elements becomes larger than it actually is.

Another problem arises, for example, when two or three images of the same object are formed on respective image pick-up devices through an intermediary such as a dichroic mirror system or other suitable light splitting systems as in the color television camera. When the output signals from such plurality of image sensing devices are processed to obtain a video signal, it is required that the relative position of the photoelectric transducers be accurately adjusted, or otherwise its influence on the output signal would present itself very noticeably when no weight from the center is given in the brightness integration as in the square pattern. With this arrangement particularly when formed as a two-dimensional sensor as in a television system, since the lateral direction of the field coincides with the line scanning direction and with that in which the time-sequential signals are read out successively, the later signal treatment must be carried out by using very elaborate means, or otherwise it will be difficult to absorb the above-described error.

As for the vertical direction, since interlaced scanning is performed, the photosignals from the vertically adjacent transducer elements occur in a time gap on the order of about 1/60 second, and therefore, the buffering of the gap of signal between the upper and lower two bits becomes very difficult to achieve no matter how well the later treatment of the signals may be carried out.

SUMMARY OF THE INVENTION

It is an object of the present invention to provide a photoelectric transducer device capable of sampling brightness information of an object image more correctly than was heretofore possible.

Another object of the invention is to obtain image section dependent, time-sequential signals which are more amenable to later signal treatment employing simple signal processing techniques.

Still another object of the invention is to provide an assembly of two or more photoelectric transducer devices for converting images of the same object to corresponding number of electrical signals with the limitation of the signal error resulting from the deviation of the relative position of the devices from the ideal points to a minimum.

A further object of the invention is to provide an image pick-up device which is adapted to the later fine adjustment.

According to an embodiment of the present invention, in a photoelectric transducer device having photoelectric transducer elements with their light receiving surfaces arranged in different points of position from each other to convert the brightnesses of different image sections of the object image to electrical signals which are then read out in time sequence, the above-described light receiving surfaces of the photoelectrical transducer elements are configured to such a shape that the proportion of a progressively farther outer zone of the area toward the surrounding other light receiving surfaces is progressively smaller, whereby the brightness information of the object image can be sampled more correctly.

Another advantage arising from the reduction of the weight on the signal in the neighborhood of the boundary of each photoelectric transducer element is that the gap of the output signal produced at this boundary region can be minimized.

In the following stage including a digital signal processing circuit, therefore, a faulty operation can be prevented from occurring.

Still another advantage arising from the progressive reduction of the area of the light receiving surface of each of the photoelectric transducer element in a direction toward the ones of the other photoelectric transducer elements which are adjacent thereto in the directions perpendicular to that in which the scanning means runs, is that when a color image pick-up apparatus is comprised of two or more photoelectric transducer devices of the invention, there is little room to produce a registration error or the like.

A further advantage is that, if the area of the light receiving surface of each of the photoelectric transducer elements is represented by a sampling function in terms of the distance measured from the center of the area of the light receiving surface as a parameter, or an approximate function thereto, the brightness information of the object image can be sampled very precisely so that the later signal processing can be carried out without causing the occurrence of any erroneous discrimination or the like.

A still further advantage is that, since the boundary of each of the light receiving surfaces of the photoelectric transducer elements with the adjacent ones includes lines making certain angles with the scanning direction as the scanning advances, the output of one of the photoelectric transducer elements is transferred to that of the next one very smoothly, whereby a strained weighting can be avoided.

DESCRIPTION OF THE PREFERRED EMBODIMENTS

Figure 1:
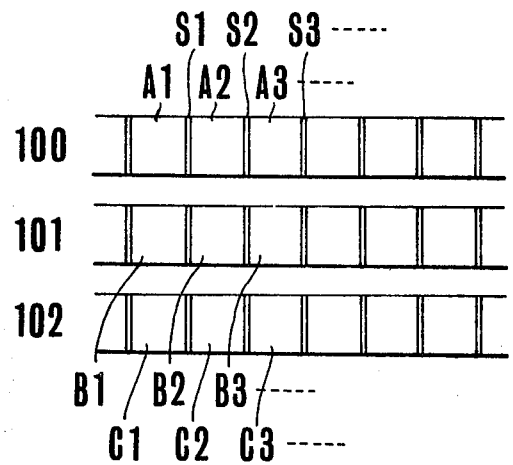
FIG. 1 is a front elevational view in an enlarged scale showing a portion of the image receiving surface of a conventional photoelectric transducer device.

The present invention will next be described in greater detail by reference to the drawings. FIG. 1 shows the photoelectric transducer portion, in part in, the conventional photoelectric transducer device, for example, a CCD. In the figure, A1, A2, A3 ... are photoelectric transducer elements oriented in a lateral direction (line scanning direction) and each having a square image receiving surface. These square elements are lined up in adjoining relation to each other through respective channel stoppers S1, S2, S3, ... and form a 100th element row. Similarly, after a space from the above-described 100th row of elements, there are a 101st row of elements B1, B2, B3, ... which are then similarly followed by a 102nd row of elements C1, C2, C3, ..., and so on. These rows of elements are all vertically aligned with each other. Thus, the elements A1, B1, C1, ... are column-oriented, and they form a two-dimensional sensor. These individual photoelectric transducer elements permit the luminance information of the various section of an object image formed on the 2-dimensional sensor at the respective elements to be converted to electrical charges, and these charges to be stored. These information signals are transferred to a charge transfer portion by clock pulses, and then produced as time-sequential signals through a register portion read out by the self-charge transfer function.

Figure 2:
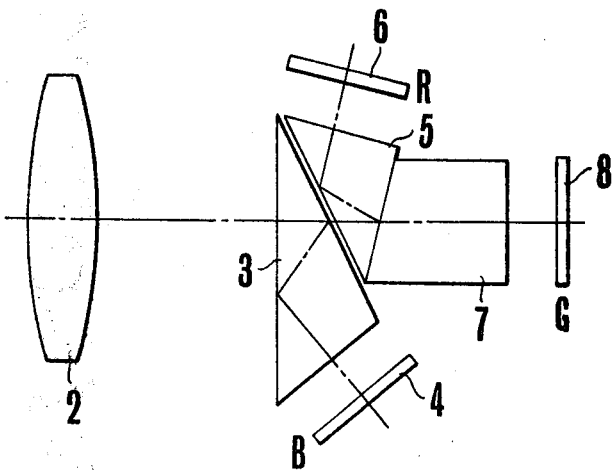
FIG. 2 is a schematic sectional view of the image pick-up system of a three-tube color television camera using the photoelectric transducer device of FIG. 1.

FIG. 2 shows the use of three photoelectric transducer devices of FIG. 1 in constituting part of an image pick-up system in a color television camera. In the figure, element 2 is an objective lens; elements 3, 5 and 7 are dichroic prisms constituting a light splitting optical system, these parts forming a three-color separation optical system.

Elements 4, 6 and 8 are blue, red and green image pick-up devices respectively with their target surfaces on which the blue, red and green components of the object image separated by the dichroic prism are focused. These blue, red and green image pick-up devices produce output signals which are then processed and transmitted from the camera as the B, R and G signals for the normal television, or the Y, I, Q signals for NTSC system.

In color television cameras, the three image pick-up devices are required to be precisely aligned with one another mechanically so that no registration error is produced between the three signal outputs, and the relative element in each photoelectric transducer device represents the luminance of the same image section.

But, this precision for an image of 2 cm long in the vertical direction and 525 scanning lines with the resultant size of the above described image section being in the order of 40 μm, has to be limited to 8 μm, even though 20% misalignment is made acceptable.

Therefore, a precision adjustment on the order of a few microns must be made with high reliability.

Figure 3:
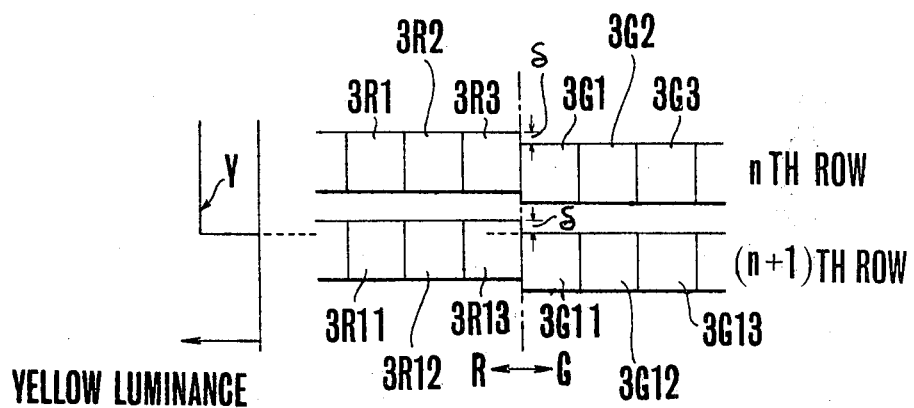
FIG. 3 is a diagram showing a vertical misalignment of two of the three tubes of the conventional type photoelectric transducer device with the resultant change in operation.

Now let us assume that the conventional type solid state image pick-up devices are used in the above-described three-tube color television camera, while, as shown in FIG. 3, the red and green image pick-up plates are misaligned from each other by a magnitude, δ, in the vertical direction. In FIGS. 3, 3R1, 3R2, 3R3, ... are an n-th row of photoelectric transducer elements in the red image pick-up tube; 3G1, 3G2, 3G3, ... are a row of photoelectric transducer elements of the same address as the n-th row of the above-described red image pickup tube in the green image pick-up tube. Also, 3R11, 3R12, 3R13, ... are an (n+1)th row of photoelectric transducer elements in the red; and 3G11, 3G12, 3G13, ... are an (n+1)th row of photoelectric transducer elements of the same address in the green. When correctly adjusted, these elements of the same address do not produce a registration error. As has been mentioned above, however, when the above-described red and green sensor plates are fixed in a condition that there is an error in the vertical direction, as the yellow component of the object image on the n-th and (n+1)th rows in these sensor plates changes like Y in FIG. 3, the n-th rows in the sensor plates receive this Y component in uniformity over the entire area of the image receiving surface of each photoelectric transducer element in the red and green sensors so that the red and green portions of spectrum of the yellow component are converted to respective electrical charges and upon later combination of the outputs from the two n-th rows, the original yellow component can be reproduced. While, on the contrary, it is in the (n+1)th rows that as far as the upper marginal zone of the width δ (for example 20%) is concerned, the Y component of the incident light bearing an object image is detected by only the red sensor elements 3R11, 3R12, 3R13 ..., but not by the green sensor elements 3G11, 3G12, 3G13. Therefore, the outputs from the (n+1)th row of red sensor elements differ from those of the same row of green sensor elements with the result that the reproduced color deviates from the true one. This means a deterioration of image quality. In more detail, when a picture is reproduced, the upper part of the picture which is yellow is downwardly followed by a red-rich part in one scanning line, thus giving an unpleasant impression to the viewer.

Such example is not always attributable to the misalignment of the tubes, and is encountered when the object includes a nearly horizontal yellow band or the like.

It is to be understood that as the registration error of 20% at most is now assumed to be acceptable, the configuration of each sensor element to a square shape as in the prior art, because of its lacking any weight on the integration in the vertical direction, permits the incorrect adjustment of alignment to present itself fully in the form of a color deviation of the output signals.

The present invention is intended to provide a novel arrangement of photoelectric transducer elements of special shape which minimizes the production of erroneous signals for color deviation due to such incorrect adjustment of alignment of the image pick-up devices as described above.

Figure 4:
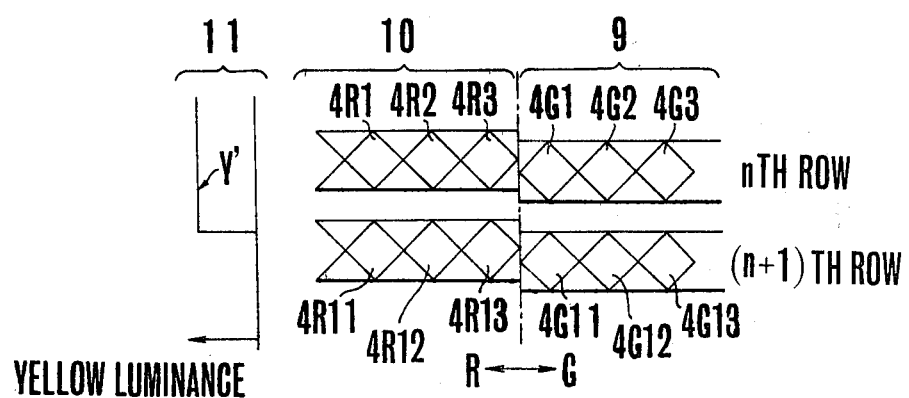
FIG. 4 is a front elevational view in an enlarged scale of one embodiment of a photoelectric transducer device according to the present invention.

FIG. 4 shows an example of configuration and orientation of the image receiving surfaces of the photoelectric transducer elements in the device of the invention. In the figure, there is shown an equivalent portion of the device to that shown in FIG. 3, where each element is oriented as turned by 90° from the position of FIG. 3 so that the opposite two corners are in a line parallel to the scanning direction. It is noted that the image receiving surface is not necessarily of regular square shape, but may be of a rhombic shape. Unlike the conventional orientation of the elements as shown in FIG. 3 where no weighting is made in the scanning direction as the distance from the center of the area increases, the element orientation of the invention in FIG. 4 gives rise to the creation of a weighting with respect to the central portion of the area. In other words, the pattern of FIG. 4 obtained by turning the square surfaces of the elements by 90° is characterized in that, as the distance from the center of the area of the surface to the adjacent ones of the other photoelectric transducer elements increases, the proportion of the area of a concentric zone decreases.

With a plurality of light sensor tubes having such arrays of photoelectric transducer elements as described above used in the image pick-up system of the color television camera of FIG. 2, when the misalignment amounts up to the same value, for example, 20% as in the conventional one, it is found that the net error can be reduced to about 16%. Therefore, even when the yellow component of the object image changes like Y' in FIG. 4, the color deviation due to the registration error can be lessened with an advantage that the precision adjustment of the apparatus can be carried out far more easily than was in the prior art.

Figure 5:
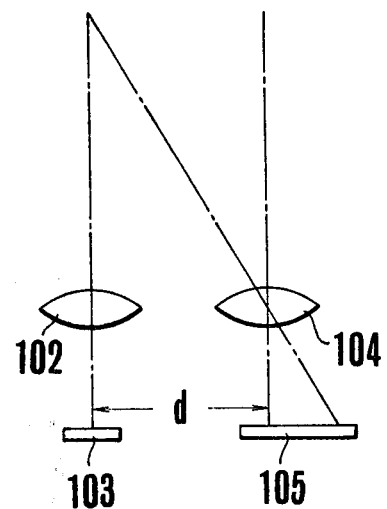
FIG. 5 is a schematic sectional view of an example of an automatic focus detection system in a photographic camera employing the photoelectric transducer device of the invention.

Next, explanation is presented concerning the construction of the photoelectric transducer elements of the invention in the form of a one-dimensional sensor, and the application of this sensor to an automatic focus detecting system of a photographic camera by reference to FIG. 5. In the figure, elements 103 and 105 are one-dimensional sensor arrays of photoelectric transducer elements arranged on a common line as spaced from each other by a distance or base line d. Element 102 is a lens system for forming a reference object image on the sensor array 103; element 104 is a lens system for forming an active object image on the sensor array 105. To measure the distance from the camera to the object, the angular position of the axis of the lens system 104 is made to change so that two images of the same object are formed on the respective sensor arrays 103 and 105 with the resultant angle at the intersection of the two optical axes contributing along with the base line length to calculate the distance.

If such apparatus illustrated has a registration error between the relative two of the elements in the sensor arrays 103 and 105, a logic noise migrates into the distance measurement result so that an accurate detection of the object distance becomes impossible. In the apparatus as shown in FIG. 5, when the orientation and configuration of the photoelectric transducer elements is changed from the conventional as shown in FIG. 3 to that of the invention as shown in FIG. 4, even the presence of the same alignment error can reduce the amount of logic noise migrated in the measurement result with an advantage that a faulty operation of the following stage electrical circuitry can be lessened.

As in the above, in the photoelectric transducer device of the invention, the spatial characteristics of the light receiving portions of its photoelectric transducer elements are so adjusted that the gain at a point of position nearer to the margin is made smaller by changing the shape and orientation of the light receiving portion, or by positioning a diffusion plate in front of the light receiving portion, thus as a total imparting such characteristics to the light receiving portion. Therefore, when the outputs from the plurality of light sensor tubes are combined, the migration of an erroneous signal (logic noise) due to the registration error is made smaller than was in the conventional one. For the shape of the element, mention may be made of those defined by $$Sa = \frac{\sin 2\pi\omega t}{2\pi\omega t}$$

representing the sampling function in the information theory where the area of each light receiving surface is measured from the center of each light receiving surface outward. If this is satisfied, the analogue change of the incident light can be converted to a spatial digital quantity correctly. In this case, the boundary between the adjacent light receiving surfaces is defined by a triangular function waveform. In practice, however, this may take the form of an approximate triangular function as shown in connection with the above-described example. Even from this, a considerable improvement can be expected.

Next, another embodiment of the present invention where the photoelectrical transducer device is so constructed that the logic noise can be lessened in the lateral direction (scanning direction) is described.

FIGS. 6 are fragmentary front elevational views in an enlarged scale of the conventional array of photoelectric transducer elements of the shape known in the art and of an example of an array of photoelectric transducer elements of a shape characteristic of the invention, and shows examples of input and output signal waveforms. In the drawing, FIG. 6(a) shows the conventional type photoelectric transducer element pattern, and FIG. 6(b) a new photoelectric transducer element pattern according to the present invention. Now assuming that the patterns of FIGS. 6(a) and 6(b) are scanned laterally, then when the luminance of light incident upon each of the arrays changes as shown in FIG. 6(c), the array of FIG. 6(a) produces output signals as shown in FIG. 6(d), and the array of FIG. 6(b) produces output signals as shown in FIG. 6(e). It will be appreciated from the waveforms that as the luminance changes stepwise, the output signals of the pattern (a) are caused to change their amplitudes largely in correspondence with the phase of luminance change and the interrelation of the sensor element pitch therewith. Therefore, the use of such signals from the conventional pattern of photoelectric transducer elements in measuring the degree of image sharpness, or in pattern recognition leads to the production of a large error. In other words, the sensor pattern rapidly quantizes the luminance pattern so that a so-called "folded strain" is liable to be produced and therefore there is a high possibility of occurrence of a moire in the reproduced pattern.

Figure 6A:
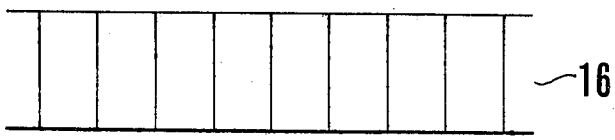
FIGS. 6(a), (b), (c), (d) and (e) are front elevational views in an enlarged scale of the conventional type photoelectric transducer device and another embodiment of the invention along with waveforms of the input and output signals occurring at portions thereof.
Figure 6B:
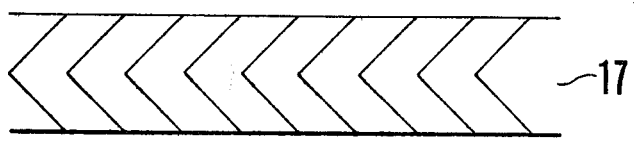
Figure 6C:
Figure 6D:
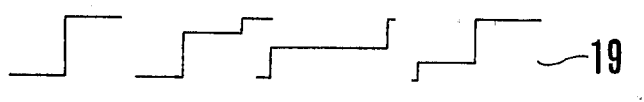
Figure 6E:
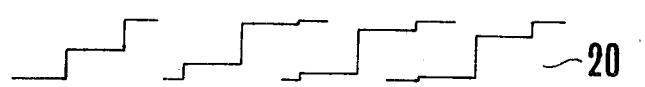

Unlike this, since the sensor pattern (b) of the invention forms a spatial high cut filter, the output signals of FIG. 6(e) are made less sensible to the phase shift in relation to the luminance change pattern, thereby it being made possible that a smaller "folded strain" is produced.

For the method of reducing such "generation strain" usable in a two-tube color television camera with each sensor plane provided with a respective color filter, mention may be made of a low pass filter in the form of an electrical circuit from which an equivalent effect to that of the invention can be expected, as the influence of the registration error between that color filter and the sensor on the color deviation is generally considered to be effectively lessened by the use of the low pass filter. This measure takes its place in the signal process after the quantization and it is therefore to be understood that this is different from the spatial filter effect before the quantization in the device of the present invention, and that the above-described conventional method though being able to smooth the signal waveform, has no effect of reducing the "folded strain."

All what is necessary to realize the photoelectric transducer element pattern of the invention is only to change the mask in the process for fabricating the sensor plate, while nevertheless a great advantage is expected. It is to be noted that in the case of the two-dimensional sensor, depending upon which direction, horizontal or vertical is emphasized, the pattern can be made more complicated in that emphasized direction than in the above-described embodiment, for example, a hang curve.

Figure 7A:
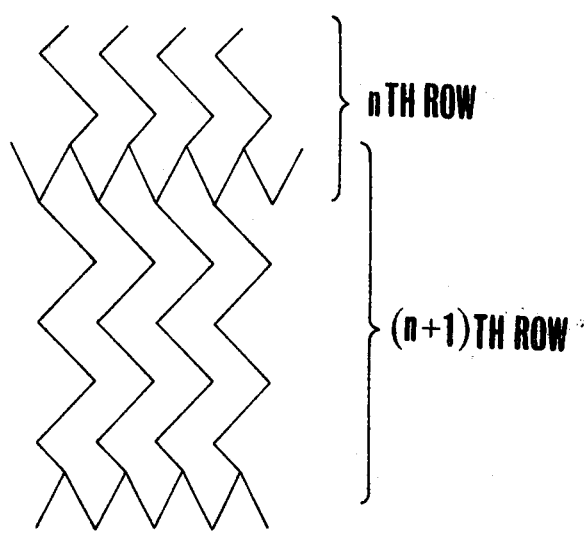
FIGS. 7(a), (b), (c), (d) and (e) are front elevational views in an enlarged scale of other different examples of the sensor pattern of the photoelectric transducer device according to the invention.

FIGS. 7(a) to 7(e) show other examples of patterns usable in the photoelectric transducer device of the invention. The pattern of FIG. 7(a) is adapted for use in a vertically somewhat elongated sensor, and has the boundary lines between the adjacent image receiving surfaces as diffused into each other in the horizontal as well as in the vertical direction.

Figure 7B:

The pattern of FIG. 7(b) has those of the boundary lines which are inclined over the entire width of each row-oriented photoelectric transducer element, so that the weight is decreased in the horizontal direction.

Figure 7C:
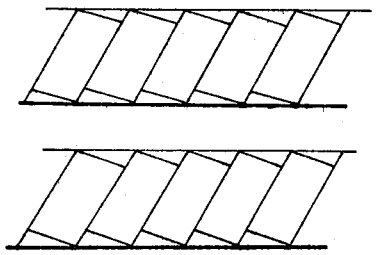

The pattern of FIG. 7(c) is an example of modification of the pattern of FIG. 7(b) with the reduction of weight also in the vertical direction.

Figure 7D:
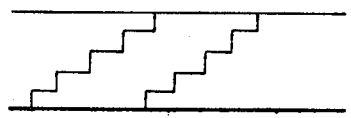

The pattern of FIG. 7(d) is another example of modification of the pattern of FIG. 7(b) and has the boundaries between the successive two image receiving surfaces in each row which are configured to a progressively stepped-up shape in the scanning direction.

Figure 7E:
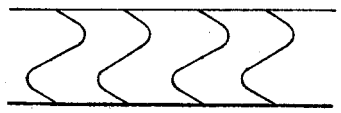

The pattern of FIG. 7(e) has the boundaries between the successive two row-oriented image receiving surfaces which are curved to a triangular function shape so that the surfaces can be represented by a sampling function.

It is noted that since the photoelectric transducer device of the invention employs no such simple or regular square shape for the light receiving surfaces of the photoelectric transducer elements corresponding to the image sections as in the prior art, but a particular shape analogous to a sampling function in its scanning direction or in a direction perpendicular thereto in order that the sampling of each image section should become very accurate so that faulty operation of discrimination in the following stage signal processing circuit can be prevented. Further the large change of the output signal due to the phase shift between the sensor and the image can be lessened, even when applied not only to the case where more than a pair of outputs of the sensors are combined with each other as has been described in connection with the embodiment of the invention but also to the case where, for example, a single-tube color television camera employs such a photoelectric transducer device as of the present invention in place of the image pick-up tube thereof in combination with a color stripe filter, such large reduction of the range of variation of the output signal can be assured.

As has been described in greater detail in connection with the embodiments of the invention, it is made possible by the use of the photoelectric transducer device of the invention that the logic noise due to the registration error which occurs when a plurality of row- and column-oriented photoelectric transducer elements are scanned is remarkably reduced. Therefore, a great advantage can be expected from the application of the invention to color television cameras in which the outputs of two or more solid state image pick-up devices are combined to produce a video signal, and to autofocus cameras in which the light sensor is required to be as effective a pattern as possible.

What is claimed is:

1. An image pick-up device comprising:
   (a) a color separation optical system which separates an incident light beam into a plurality of light beams having different colors; and
   (b) a plurality of solid state image pick-up devices each arranged so as to receive the light beams separated by the color separation optical system, and each having a plurality of photoelectric elements arranged in a matrix pattern in rows and columns, each photoelectric element having a light receiving surface, whereby light receiving surface of adjacent photoelectric elements form an overlapping zone at least in one direction along the row or the column.

2. An image pick-up device according to claim 1, in which the color separation optical system includes a dichroic prism.

3. An image pick-up device according to claim 1, in which the color separation optical system and individual solid state image pick-up devices are so arranged to assure that corresponding images fall on photoelectric elements positioned at a predetermined same matrix position within the solid image pick-up device.

4. A solid state image pick-up device comprising:
   a plurality of photoelectric elements arranged in a matrix pattern in row-orientation and column-orientation, each of said elements having a light receiving surface, and light receiving surfaces of photoelectric elements adjacent each other in row-orientation and column-orientation having a mutually overlaping zone in row-orientation and column-orientation.

* * * * *